United States Patent
Krupski et al.

(10) Patent No.: US 11,313,240 B2
(45) Date of Patent: Apr. 26, 2022

(54) ROUNDED RADIAL SNAP CONFIGURATION FOR A GAS TURBINE ENGINE COVER PLATE

(71) Applicant: United Technologies Corporation, Farmington, CT (US)

(72) Inventors: Timothy R. Krupski, Cromwell, CT (US); Peter V. Tomeo, Middletown, CT (US)

(73) Assignee: Raytheon Technologies Corporation, Farmington, CT (US)

(*) Notice: Subject to any disclaimer, the term of this patent is extended or adjusted under 35 U.S.C. 154(b) by 35 days.

(21) Appl. No.: 16/782,538

(22) Filed: Feb. 5, 2020

(65) Prior Publication Data
US 2021/0239007 A1 Aug. 5, 2021

(51) Int. Cl.
*F01D 5/30* (2006.01)
*F02K 3/072* (2006.01)
*F02C 3/067* (2006.01)

(52) U.S. Cl.
CPC ............ *F01D 5/3015* (2013.01); *F02K 3/072* (2013.01); *F02C 3/067* (2013.01); *F05D 2220/323* (2013.01); *F05D 2240/24* (2013.01); *F05D 2240/80* (2013.01); *F05D 2250/712* (2013.01); *F05D 2260/30* (2013.01); *F05D 2260/40311* (2013.01); *F05D 2260/941* (2013.01)

(58) Field of Classification Search
CPC ........ F01D 5/30; F01D 5/3007; F01D 5/3015; F05D 2250/711; F05D 2250/712; F05D 2220/323; F05D 2240/24; F05D 2240/80; F05D 2260/30; F05D 2260/40311; F05D 2260/941; F02K 3/072; F02C 3/067; F16B 21/06; F16B 21/071

USPC ........................................ 416/219 R, 220 R
See application file for complete search history.

(56) References Cited

U.S. PATENT DOCUMENTS

| 3,853,425 A * | 12/1974 | Scalzo .................... F01D 5/18 416/95 |
| 5,816,776 A | 10/1998 | Chambon et al. |
| 9,677,407 B2 | 6/2017 | Borja et al. |
| 10,392,966 B2 | 8/2019 | Caprario et al. |
| 2012/0128498 A1 | 5/2012 | Basiletti et al. |
| 2015/0159496 A1* | 6/2015 | Pouzet ................. F01D 11/006 415/171.1 |
| 2015/0369061 A1* | 12/2015 | Sandoval ............... F01D 5/082 60/805 |
| 2017/0009595 A1* | 1/2017 | McCaffrey ........... F01D 5/3015 |
| 2017/0268354 A1* | 9/2017 | Oren ...................... F01D 5/3015 |
| 2017/0292396 A1* | 10/2017 | Matthews ................. F01D 5/02 |

OTHER PUBLICATIONS

European search report for Application No. 21153773.3 dated Jun. 8, 2021.

* cited by examiner

*Primary Examiner* — Woody A Lee, Jr.
*Assistant Examiner* — Elton K Wong
(74) *Attorney, Agent, or Firm* — Carlson, Gaskey & Olds, P.C.

(57) ABSTRACT

A rotating machine includes a plurality of rotors. Each of the rotors includes a rotor bore protruding radially inward from a platform. A ring shaped cover plate is interfaced with each rotor bore via at least one snap. The at least one snap includes a first arm extending from the cover plate and having a convex facing contact surface, and multiple second arms extending axially from each rotor bore and having contact surfaces facing the convex surface.

14 Claims, 3 Drawing Sheets

ROUNDED RADIAL SNAP CONFIGURATION FOR A GAS TURBINE ENGINE COVER PLATE

TECHNICAL FIELD

The present disclosure relates generally snaps for turbine rotor cover plates, and more specifically to a snap including a convex radial surface.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

Included within the turbine are multiple stages, each of which includes multiple rotors with a cover plate attached to the rotor structures. Contact is maintained between the cover plate and portions of the rotors at least in part using radial facing contacts referred to as snaps. In existing systems the interfacing snaps are subject to high loads during engine operation. In addition the interfacing snaps are subject to axial shifting due to the movement of components during engine operation. The combination of high loads and axial shifting can result in large compressive strains that are detrimental to the lifecycle of the cover plate.

SUMMARY OF THE INVENTION

In one exemplary embodiment a rotating machine includes a plurality of rotors, each of the rotors including a rotor bore protruding radially inward from a platform, and a ring shaped cover plate interfaced with each rotor bore via at least one snap. The at least one snap includes a first arm extending from the cover plate and having a convex facing contact surface, and a plurality of second arms extending axially from each rotor bore and having contact surfaces facing the convex surface.

In another example of the above described rotating machine the convex facing contact surface is a radially outward facing contact surface.

In another example of any of the above described rotating machines the convex radially outward facing contact surface is defined by an arc having a constant radius.

In another example of any of the above described rotating machines the convex radially outward facing contact surface is defined by an arch having a variable radius.

In another example of any of the above described rotating machines the convex radially outward facing contact surface is biased away from the cover plate and towards the rotor bore.

In another example of any of the above described rotating machines the convex radially outward facing contact surface is biased toward the cover plate and away from the rotor bore.

In another example of any of the above described rotating machines each radially inward facing contact surface is concave.

In another example of any of the above described rotating machines a curvature of each radially inward facing contact surface matches a curvature of the radially outward facing contact surface.

In another example of any of the above described rotating machines a curvature of the radially inward facing contact surface has a larger radius than a curvature of the radially outward facing contact surface.

In another example of any of the above described rotating machines at least one of the radially inward facing contact surfaces and the radially outward facing contact surface includes at least one of an intrusion feature and an extrusion feature.

In another example of any of the above described rotating machines each of the radially inward facing contact surfaces and the radially outward facing contact surface includes at least one of an intrusion feature and an extrusion feature.

In another example of any of the above described rotating machines the rotating machine is a gas turbine engine, and wherein each of the rotors and the cover plate are components of a turbine stage of the gas turbine engine.

In one exemplary embodiment a cover plate for a rotating machine includes a ring shaped body having at least one snap arm protruding axially from the ring shaped body, the at least one snap arm having a convex radially outward facing contact surface.

In another example of the above described cover plate for a rotating machine the convex radially outward facing contact surface has a constant arc radius.

In another example of any of the above described cover plates for a rotating machine the convex radially outward facing contact surface has a variable arc radius.

In another example of any of the above described cover plates for a rotating machine the convex radially outward facing contact surface is biased away from the ring shaped body.

In another example of any of the above described cover plates for a rotating machine the convex radially outward facing contact surface is biased toward the ring shaped body.

In another example of any of the above described cover plates for a rotating machine at least one snap arm includes a second snap arm having a second convex radially outward facing surface.

In another example of any of the above described cover plates for a rotating machine the convex radially outward facing surface is biased toward the ring shaped body and the second convex radially outward facing surface is biased away from the ring shaped body.

In another example of any of the above described cover plates for a rotating machine the convex radially outward facing surface and the second convex radially outward facing surface each include a corresponding constant arc radius.

An exemplary method for distributing snap loads for a turbine rotor snap configuration includes providing a convex curvature on a radially outward facing contact surface of a cover plate snap arm.

These and other features of the present invention can be best understood from the following specification and drawings, the following of which is a brief description.

DETAILED DESCRIPTION

Figure 1:
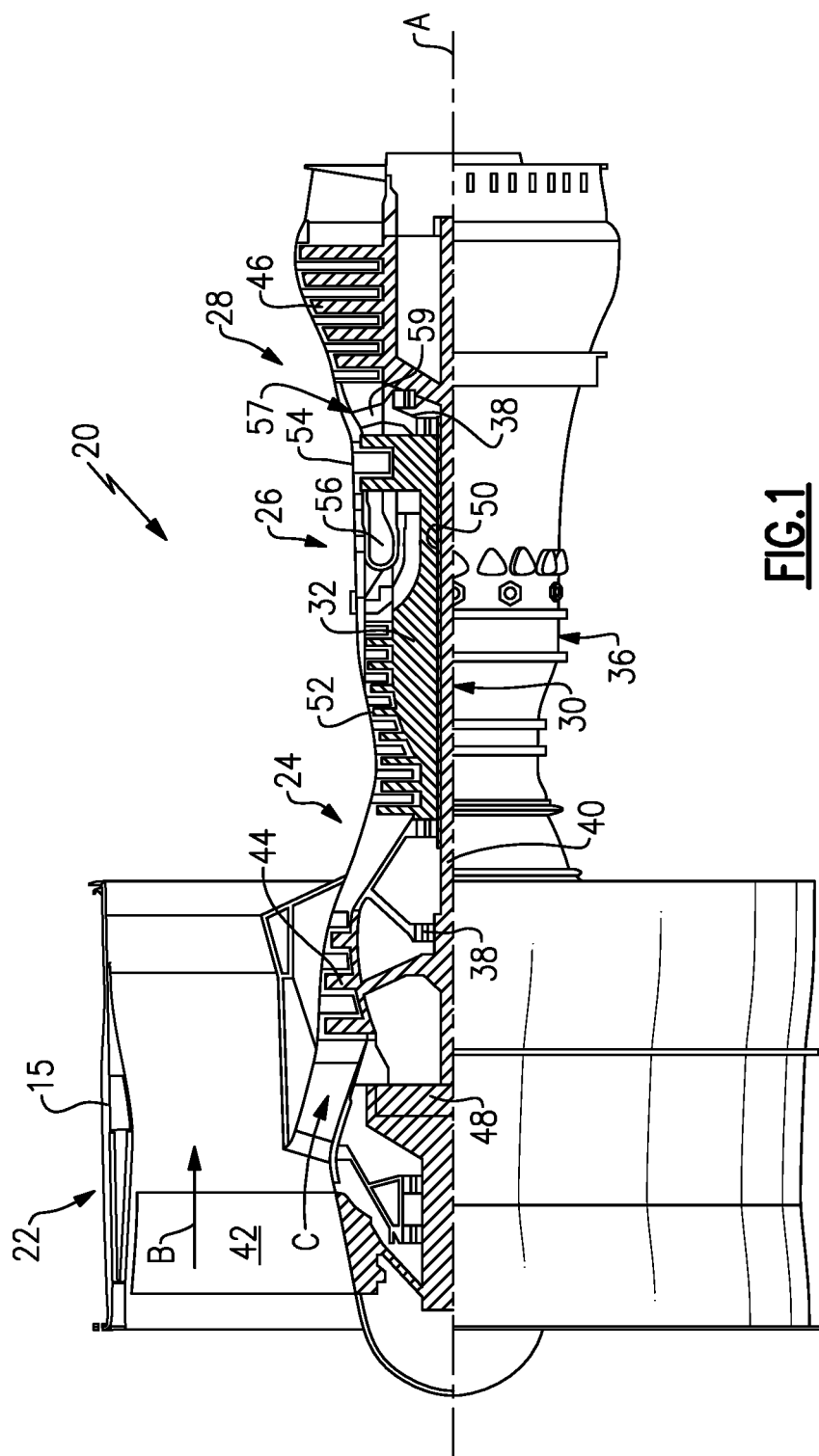
FIG. 1 illustrates a high level schematic view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
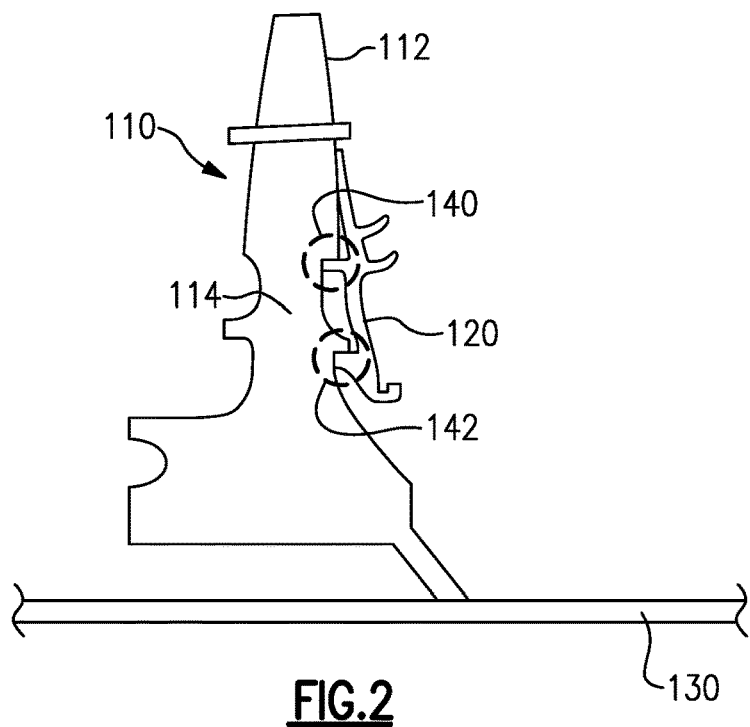
FIG. 2 schematically illustrates a cross sectional view of a portion of a turbine stage for the gas turbine engine of FIG. 1.

With continued reference to FIG. 1, FIG. 2 schematically illustrates an exemplary turbine rotor 110 and cover plate 120 such as can be incorporated in a turbine stage of the engine 20 illustrated in FIG. 1. The rotor 110 includes a rotor blade 112 that extends into a primary gaspath and a rotor bore 114 that extends radially inward and interfaces with a shaft 130 allowing the rotor blade 112 to drive rotation of the shaft 130. The exemplary rotor 110 is one of a set of circumferentially arranged turbine rotors in a single stage. The cover plate 120 is interfaced with each rotor 110 in the stage in the illustrated manner.

The cover plate 120 is interfaced, at least partially, with the rotor bore 114 via two snaps 140, 142. The snaps 140, 142 include a radially outward facing surface of the cover plate 120 contacting a radially inward surface of the rotor bore 114. Due to the relative radii of the rotor bore 114, as well as growth and relative motions due to normal engine operations, and the cover plate 120 contact surfaces, the radially outward facing surfaces of the cover plate 120 press against the radially inward facing surfaces of the rotor bore 114, and the cover plate is maintained in position. However, the relative sizing also imposes a radially aligned load (i.e. compressive strain) on the snaps, with the load increasing as the disparity between the radii increases.

Figure 3:
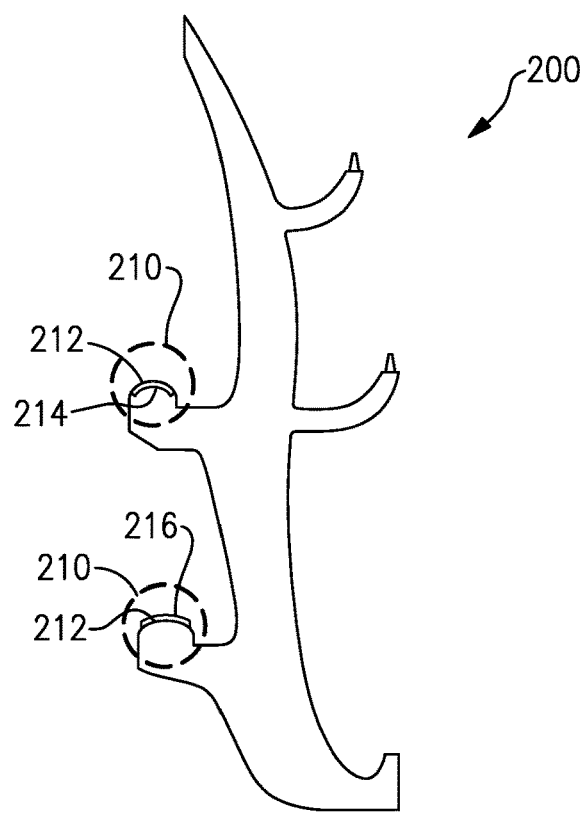
FIG. 3 schematically illustrates a cross sectional view of the cover plate of FIG. 2.

With continued reference to FIGS. 1 and 2, FIG. 3 schematically illustrates a cross section of an exemplary cover plate 200 including snap features 210 configured to reduce the impact of compressive stresses, and thereby increase the durability of the cover plate 200. The cross section is a radial cross section, with the cover plate 200 being ring shaped. In some examples, the ring is complete with no radial openings, and in other examples the ring shape can include a radial cut allowing for easier assembly.

In contrast to conventional snap features, each of the snap features 210 includes a convex (curved radially outward) facing surface 212. The convex surface 212 extends a full circumferential length of the snap feature 210 creating a convex contact surface 212 that allows the radially outward facing surface of the cover snap 210 to contact the radially inward facing surface of the bore snap (illustrated in FIG. 2) at a predefined location, thereby controlling the distribution of the loads. In some examples, one or both of the convex surfaces 212 can include contact features 214, 216 that either protrude from (as in the bottom feature 216) or intrude into (as in the top feature 216) the convex surface 212.

By altering the curvature of the surface 212, the distribution of stress can be controlled to be more local, or more distributed, depending on the particular shape of the curvature. In the example of FIG. 3, the curvature of each snap 210 has a consistent arc radius. In alternative examples, such as those illustrated in FIGS. 6 and 7 the arc radius is not consistent, thereby providing a bias toward shifting the load axially forward (FIG. 6) or axially aft (FIG. 7).

Figure 4:
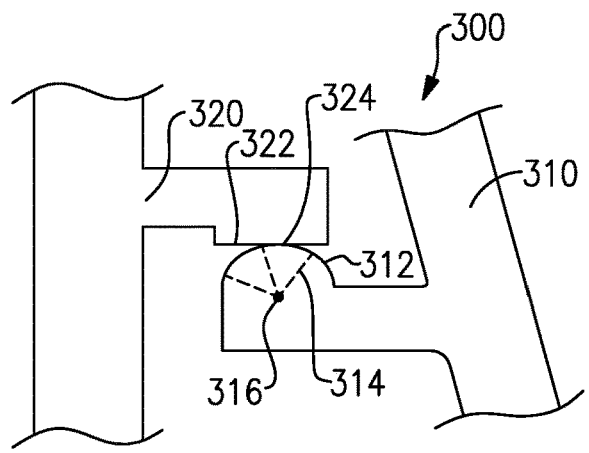
FIG. 4 schematically illustrates a cross sectional view of a cover plate snap configuration according to one example.

With continued reference to FIGS. 1-3, FIG. 4 schematically illustrates a zoomed in view of one exemplary snap configuration 300. The radially outward facing curved surface 312 of the cover plate snap 310 has a consistent radius 314. The result of the consistent radius 314 is that axial shifting of the cover plate snap 310, relative to the bore snap 320, does not alter the point 314 at which the stresses are transferred to the cover plate 310. Similarly, flexing of the snap 310 does not change the point 316 where the stresses are transferred. In the example of FIG. 4, the bore snap 320 includes a straight radially inward facing surface 322 that contacts the radially outward facing surface 312 at a single point 324. The sum result of the configuration illustrated in FIG. 4 is that the stresses on the cover plate 310 remain evenly distributed through all operational modes, and when the cover plate is subjected to axial shifting.

Figure 5:
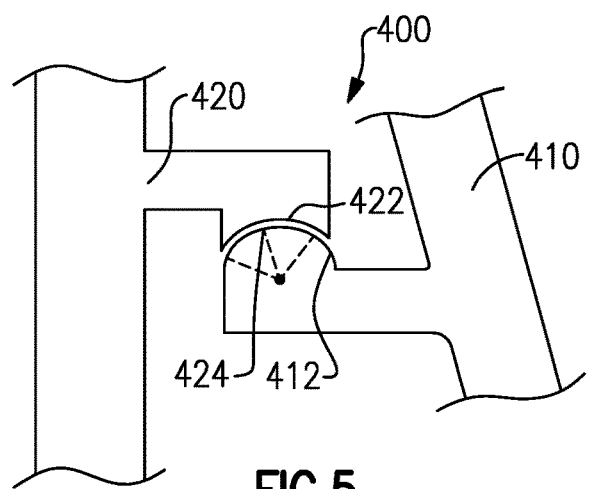
FIG. 5 schematically illustrates a cross sectional view of a cover plate snap configuration according to another example.

With continued reference to FIG. 4, FIG. 5 illustrates a snap 400 including a modification to the radially inward facing surface 422 of the bore snap 420. As with the example of FIG. 4, the radially outward facing surface 412 of the cover plate snap 410 has a consistent curvature, allowing for a single point 424 to transfer the stresses as described with regards to FIG. 4. In addition to the convex curvature of the radially outward facing surface 412, the example of FIG. 5 includes a concave curvature on the radially inward facing surface 422. The concave curvature further assists in preventing relative axial shifting of the cover plate 410 and the rotor bore 420, thereby further ensuring that the stresses are evenly distributed during operation. In the illustrated example, the concave curvature of the inward facing surface 422 matches the curvature of the convex curvature of the outward facing surface 412. By utilizing a matching curvature, a maximum surface area of contact is maintained during operation. In alternative examples, the curvature of the convex inward facing surface 422 can have a larger arc radius than the curvature of the convex surface of the cover plate snap which allows the cover plate to shift relative to the bore, while providing angular surfaces that ease the cover plate back toward the non-shifted position.

Figure 6:
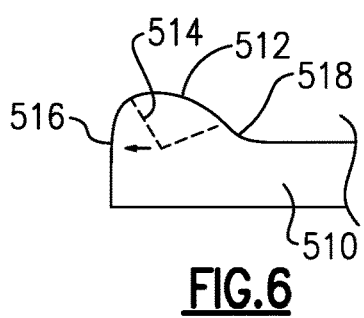
FIG. 6 schematically illustrates a cross sectional view of a cover plate arm with an axial rearward facing bias.
Figure 7:
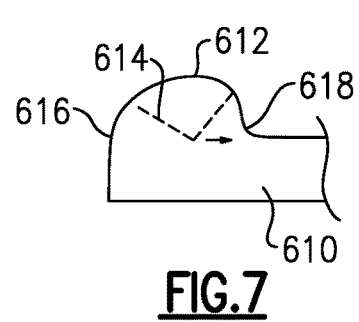
FIG. 7 schematically illustrates a cross sectional view of a cover plate arm with an axial forward facing bias.

With continued reference to FIGS. 1-5, FIG. 6 illustrates a cover plate arm 510 including a convex contact surface 512. The convex contact surface 512 has an arc radius 514 that varies across the arc of the surface 512, with a forward most position 516 of the surface 512 having the smallest radius 514 and a downstream most position 518 of the surface 512 having the largest radius 514. The configuration of FIG. 6 is referred to as being biased away from the cover plate, and shifts the position where stress is transferred to the arm 510 away from the cover plate body.

In contrast to the example of FIG. 6, FIG. 7 illustrates a cover plate arm 610 with a convex contact surface 612 where the radius of the arc is largest at the forward most position 616 and smallest at the downstream most position 618. The configuration of FIG. 7 is referred to as being biased toward the cover plate, and shifts the position where stress is transferred to the arm 610 toward the cover plate body.

With continued reference to FIGS. 1-7, FIG. 8 illustrates an arm 710 with the concave surface 712 being shifted toward the cover plate body and away from the extreme end of the arm 710. Shifting the convex surface 712 away from the extreme end of the arm 710 allows precise positioning of the point 714 where stresses are transferred into the arm 710, and allows for further fine tuning of the snap incorporating the snap arm 710.

Figure 8:
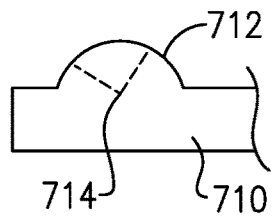
FIG. 8 schematically illustrates a cross sectional view of a cover plate arm with an axially shifted cover plate snap.

With reference to all of FIGS. 6-8, it is appreciated that a single cover plate including multiple snaps, such as the cover plate illustrated in FIGS. 2 and 3, can include axial shifted contact surfaces and non-axial shifted contact surfaces as well as contact surfaces including forward biases and contact surfaces including aft biases within a single cover plate body.

Further, while described herein with reference to a turbine stage cover plate including two snap features, it is appreciated that the features for reducing compressive strain can be applied to alternative snap positions within a gas turbine engine, as well as to any other rotating machine including single snap configurations, axial snap configurations, and the like.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A rotating machine comprising:
   a plurality of rotors, each of the rotors including a rotor bore protruding radially inward from a platform,
   a ring shaped cover plate interfaced with each rotor bore via at least one snap;
   the at least one snap comprising a first arm extending from the cover plate and having a convex facing contact surface, and a plurality of second arms extending axially from each rotor bore and having contact surfaces facing the convex surface;

wherein the convex facing contact surface is a radially outward facing contact surface and the contact surfaces of the second arms are radially inward facing contact surfaces;

wherein at least one of the radially inward facing contact surfaces and the radially outward facing contact surface includes at least one of a feature intruding into the surface and a feature extruding from the surface; and wherein each radially inward facing contact surface is concave at a position where the radially inward facing contact surface contacts the corresponding radially outward facing contact surface.

2. The rotating machine of claim 1, wherein the convex radially outward facing contact surface is defined by an arc having a constant radius.

3. The rotating machine of claim 1, wherein the convex radially outward facing contact surface is defined by an arc having a variable radius.

4. The rotating machine of claim 3, wherein the convex radially outward facing contact surface is biased away from the cover plate and towards each rotor bore.

5. The rotating machine of claim 3, wherein the convex radially outward facing contact surface is biased toward the cover plate and away from each rotor bore.

6. The rotating machine of claim 3, wherein a forward most position of the convex radially outward facing contact surface has the smallest radius and a downstream most position of the surface has the largest radius.

7. The rotating machine of claim 3, wherein a forward most position of the convex radially outward facing contact surface has the largest radius and a downstream most position of the surface has the smallest radius.

8. The rotating machine of claim 1, wherein a curvature of each radially inward facing contact surface matches a curvature of the radially outward facing contact surface.

9. The rotating machine of claim 1, wherein a curvature of the radially inward facing contact surface has a larger radius than a curvature of the radially outward facing contact surface.

10. The rotating machine of claim 1, wherein each of the radially inward facing contact surfaces and the radially outward facing contact surface includes the at least one of the feature intruding into the surface and the feature extruding from the surface.

11. The rotating machine of claim 1, wherein the rotating machine is a gas turbine engine, and wherein each of the rotors and the cover plate are components of a turbine stage of the gas turbine engine.

12. The rotating machine of claim 1, wherein the radially outward facing contact surface includes the feature intruding into the surface, and the feature intruding into the surface intrudes into the convex radially outward facing contact surface.

13. The rotating machine of claim 1, wherein the radially outward facing contact surface includes the feature extruding from the surface, and the feature extruding from the surface protrudes from the convex radially outward facing contact surface.

14. The rotating machine of claim 1, wherein the radially outward facing contact surface extends a full circumferential length of the at least one snap.

* * * * *